US006989609B2

(12) United States Patent
Marek et al.

(10) Patent No.: US 6,989,609 B2
(45) Date of Patent: Jan. 24, 2006

(54) METHOD AND APPARATUS FOR SUPPLYING ENERGY TO SENSORS

(75) Inventors: Jiri Marek, Reutlingen (DE); Matthias Illing, Kusterdingen (DE); Hans-Peter Trah, Stuttgart (DE); Oliver Schatz, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/832,770

(22) Filed: Apr. 26, 2004

(65) Prior Publication Data

US 2004/0212195 A1 Oct. 28, 2004

(30) Foreign Application Priority Data

Apr. 25, 2003 (DE) ................................ 103 18 733

(51) Int. Cl.
*H02P 9/04* (2006.01)

(52) U.S. Cl. ...................... 290/1 A; 290/1 R; 290/1 D; 60/370; 310/15

(58) Field of Classification Search ................ 290/1 A, 290/1 R, 1 D; 60/370; 310/15
See application file for complete search history.

(56) References Cited

U.S. PATENT DOCUMENTS

| | | | | |
|---|---|---|---|---|
| 5,337,560 | A * | 8/1994 | Abdelmalek | 60/370 |
| 5,578,877 | A * | 11/1996 | Tiemann | 310/15 |
| 5,696,413 | A * | 12/1997 | Woodbridge | 310/15 |
| 6,255,755 | B1 * | 7/2001 | Fei | 310/184 |
| 6,747,797 | B2 * | 6/2004 | Liu et al. | 73/146 |

* cited by examiner

*Primary Examiner*—Darren Schuberg
*Assistant Examiner*—Iraj A. Mohandesi
(74) *Attorney, Agent, or Firm*—Kenyon & Kenyon

(57) ABSTRACT

An apparatus for supplying energy to a sensor co-moved with a wheel of a vehicle, which contains a generator co-moved with the wheel of the vehicle, the generator generating electrical energy from vibrational motions of the vehicle.

12 Claims, 3 Drawing Sheets

METHOD AND APPARATUS FOR SUPPLYING ENERGY TO SENSORS

FIELD OF THE INVENTION

The present invention relates to a method and apparatus for supplying energy to sensors.

BACKGROUND INFORMATION

There are autonomous sensors (e.g. tire pressure sensors) are supplied with electrical energy by way of a battery mounted on the tire or wheel.

SUMMARY OF THE INVENTION

The exemplary embodiment of the present invention relates to an apparatus, for supplying energy to a sensor in or on a vehicle, which contains a generator, the generator generating electrical energy from vibrational motions of the vehicle.

The exemplary embodiment of the present invention further relates to an apparatus, for supplying energy to a sensor co-moved with a wheel of a vehicle, which contains a generator co-moved with the wheel of the vehicle, the generator generating electrical energy from vibrational motions of the vehicle wheels.

Energy is thus supplied to the sensor by the vibrational motions of the wheels that are always present while driving, so that the batteries hitherto used for that purpose can be dispensed with. The following advantages may thus be obtained: small physical size; no limitation on service life; no exhaustion of the battery; high reliability; and low cost.

In an exemplary embodiment, the generator contains a plate capacitor system whose plate systems are moved relative to one another by the vibrational motions of the wheels. These systems can be manufactured using the technique of surface micromechanics.

In another example embodiment, in predetermined first relative positions of the plate systems with respect to one another, the plate capacitor system is at least partially discharged, and in predetermined second relative positions of the plate systems with respect to one another, the plate capacitor system is at least partially recharged.

In this context, discharging is accomplished until the electrical voltage of the plate capacitor system has decreased to a first limit value. By analogy with this, the charging can occur until the voltage has once again reached a second limit value.

In another example embodiment, the presence of the first relative positions and the second relative positions of the plate systems with respect to another is ascertained by way of a position detector.

In another example embodiment a first relative position is present when the plate capacitor system has a low capacitance, and a second relative position is present when the plate capacitor system has a high capacitance.

In the context of a low (or relatively low) capacitance of the plate capacitor system, a predefined charge quantity on the plates results in a relatively high voltage, which can be tapped. In the context of a high capacitance, the same predefined charge quantity results in a much lower voltage, i.e. recharging of the capacitor occurs at a lower electrical voltage than discharging. This results in an energy gain which can be used, for example, to supply energy to a tire pressure sensor. In this context, the terms "low capacitance" and "high capacitance" of course refer to the capacitance of the plate capacitor system.

In another example embodiment, as a function of the relative position ascertained by the position detector, at least one switch is controlled and a charging or discharging of the plate capacitor system is thereby brought about. This ensures that charging and discharging of the capacitor are accomplished in the respectively suitable states (relative position of the plate systems with respect to one another).

The switch may be implemented as an electronic switch. This switch can be implemented, for example, as a transistor.

In another example embodiment, the generator contains a permanent magnet co-moved with the wheel, and the electrical energy is generated by the motion of an electrical conductor in the field of the permanent magnet.

In another example embodiment, the energy is used to charge an energy accumulator co-moved with the vehicle wheel. This allows energy to be supplied to the sensor even when the vehicle is stationary.

In another example embodiment, the sensor is a tire pressure sensor, or a tire temperature sensor, or a tire force sensor, or a tire identification sensor.

An exemplary embodiment of the present invention is applied in the context of a motor vehicle.

In an exemplary embodiment, the apparatus is implemented by micromechanical construction.

DETAILED DESCRIPTION

An energy supply system, based on an electrodynamic principle, or an electrostatic principle, is used for autonomous sensors (e.g. tire pressure sensors). In both cases, an oscillating structure is excited to oscillate by vibrations in the vehicle. An embodiment consists, for example, in the "inverse" use of micromechanical sensors. In a micromechanical rotation rate sensor, for example, the resonator is driven by way of an oscillating current in a conductor path in an external magnetic field. If that resonator is, conversely, caused to move by oscillations of the wheel or other vibrations in the vehicle, then because of magnetic induction (i.e. motion of a conductor in a magnetic field), a current is induced in the conductor path (=electrodynamic principle). Such structures can be manufactured using pure surface micromechanics.

Another embodiment (based on electrostatics) dispenses with a magnetic field encompasses, in its basic principle, two charged capacitor plates. These carry a specific electric charge that differs only in terms of sign. When the two plates move away from one another as a result of the vibration (=greater plate spacing, lower capacitance), the electrical voltage between the capacitor plates then rises. This results physically from the fact that because of the electrical attractive force between the plates, mechanical work is performed against the electric field and against that force. The charge in the context of the elevated voltage can be tapped using a switched-capacitor (SC) circuit. The two plates then move back toward one another because of the vibration or oscillatory motion. As a result, the voltage (already lowered in any case by removal of the charges) drops further. At a small plate spacing (high capacitance) and low voltage, the capacitor is then recharged. In this charging operation, less energy needs to be conveyed to the capacitor than was taken from it. The energy difference derives from the kinetic energy of the capacitor plates generated by the oscillatory process.

Figure 1:
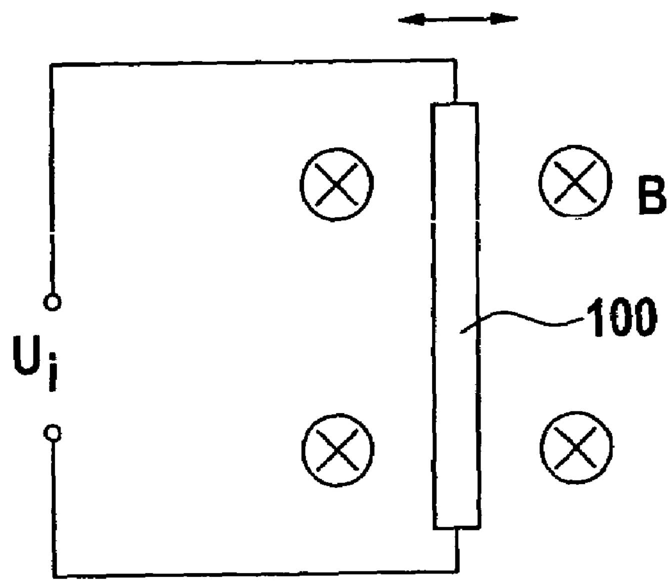
FIG. 1 shows the electrodynamic principle in one embodiment.

The electrodynamic characteristic (principle) is depicted in FIG. 1, in which magnetic field B (i.e. magnetic induction B) points into the plane of the drawing. An electrically conductive element 100 moves back and forth (shown by "<-->") in this field as a result of a vibrational motion. This generates, as a result of the Lorentz force, an alternating voltage $U_i$ that can be tapped between two terminals and rectified. With this, for example, an energy accumulator that serves to supply current to e.g. a tire pressure sensor can be charged.

Figure 2:
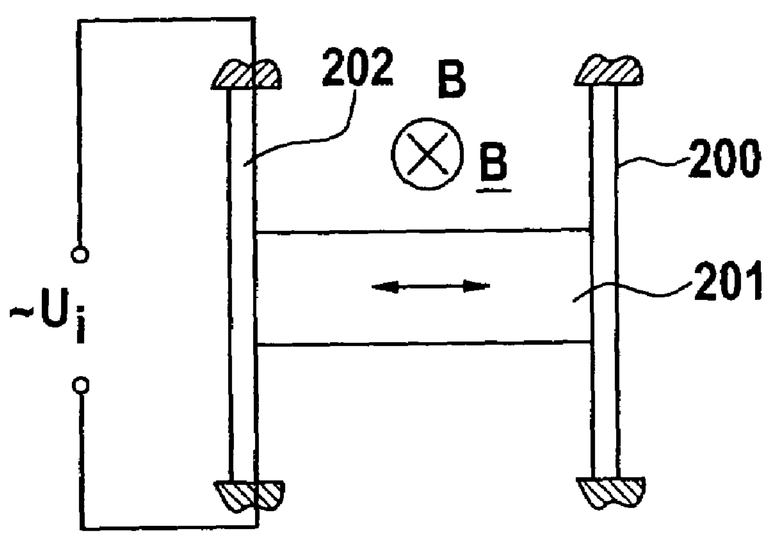
FIG. 2 shows a further embodiment based on the electrodynamic principle.

Another embodiment, based on electrodynamics, is depicted in FIG. 2. Here 200 designates a resilient suspension system (e.g. a leaf spring) on which a mass 201 is mounted. Mounted on this mass at the left is conductor 202, once again attached resiliently, at which an alternating voltage can be tapped in accordance with the functional principle shown in FIG. 1. The purpose of mass 201 is to make conductor 202, because of the attachment of the mass, experience an amplified deflection as a result of the vibratory motion.

Figure 3:
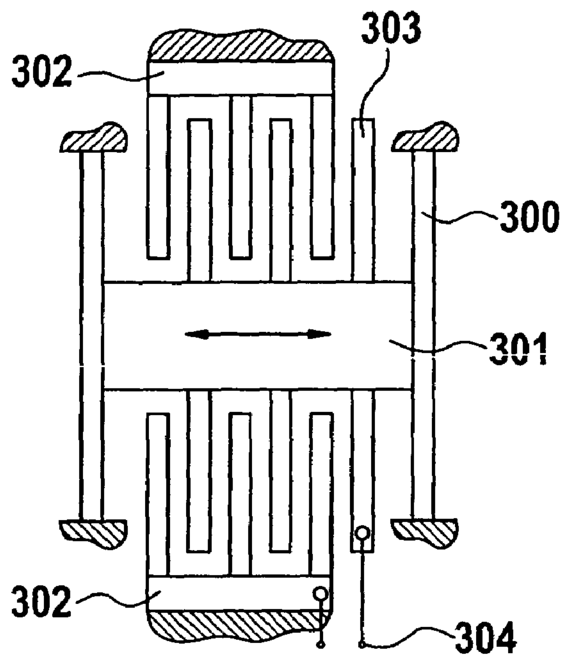
FIG. 3 shows an embodiment based on the electrostatic principle.

An embodiment of the electrostatic arrangement is depicted in FIG. 3. Here 300 in turn designates the resilient suspension system and 301 designates a mass. Plate systems 302 and 303 constitute a capacitor and are moved with respect to one another. 304 designates the electrical connecting leads. Connected to them is an electrical circuit which discharges the capacitor in the high-voltage (and low-capacitance) state, and charges it in the low-voltage (and high-capacitance) state.

Figure 4:
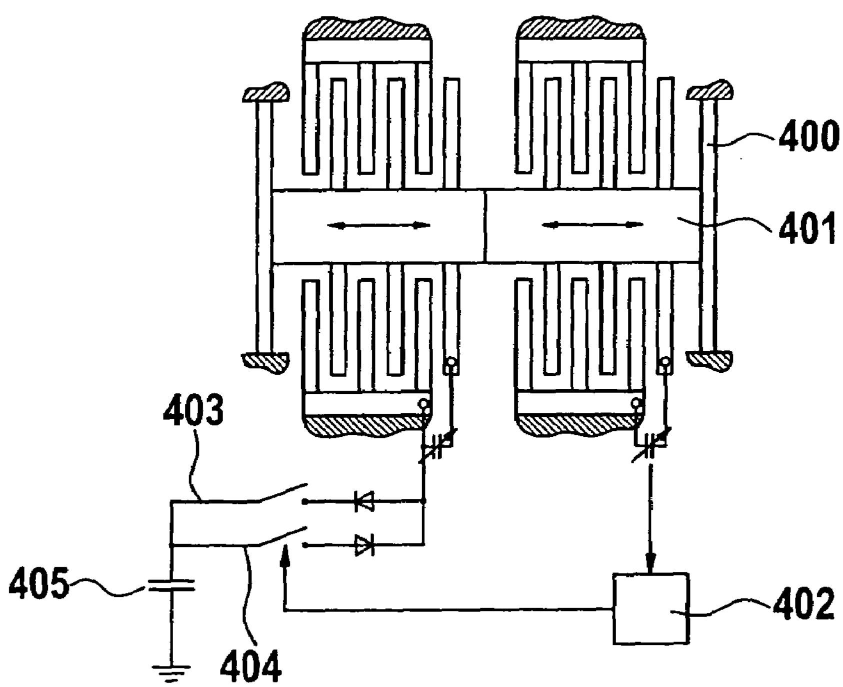
FIG. 4 shows a further embodiment based on the electrostatic principle.

Another embodiment is depicted in FIG. 4. Once again, 400 designates the resilient suspension system and 401 designates the mass. 402 designates a position detector that detects the relative positions of the plate systems with respect to one another (and therefore the instantaneous capacitance of the capacitor). The switches of paths 403 and 404 are actuated as a function of the output signal of position detector 402: 403 designates the "accumulation path" that allows charging of energy accumulator 403, and 404 identifies the "recharge path" which permits charging of the plate system. This is evident from the directions of the respective diodes in the two paths.

Figure 5:
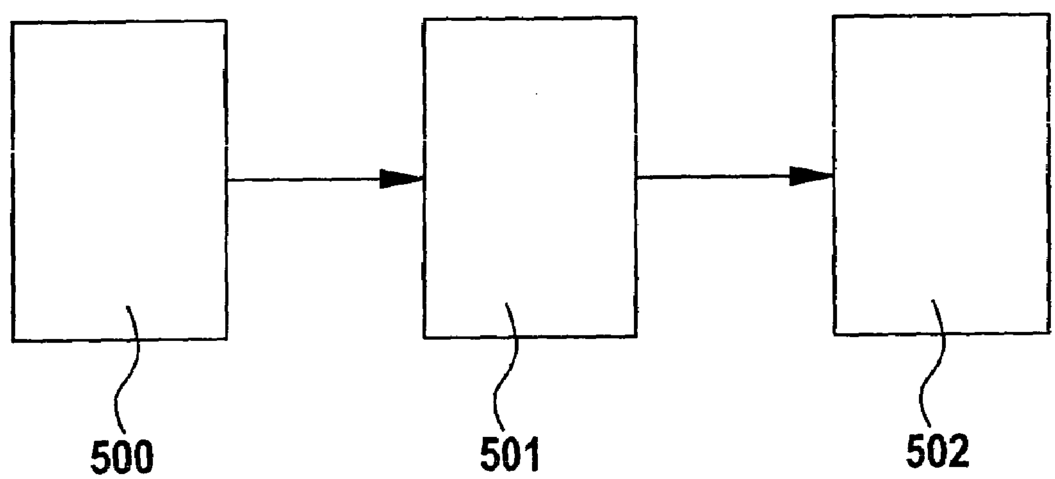
FIG. 5 shows the entire system.

The entire system is sketched in FIG. 5. Here block 500 designates the generator according to the present invention, block 501 designates an energy accumulator (optionally having an associated upstream circuit such as, for example, a rectifier), and block 502 designates the sensor.

What is claimed is:

1. An apparatus, for supplying energy to a sensor of a vehicle, the apparatus comprising:

a generator to generate electrical energy from vibrational motions of the vehicle wherein the generator contains a plate capacitor system that includes plate systems that are moved relative to one another by the vibrational motions.

2. The apparatus of claim 1, wherein a generator co-moves with a wheel of the vehicle to generate electrical energy from the vibrational motions of the vehicle wheels.

3. The apparatus of claim 1, wherein in predetermined first relative positions of the plate systems with respect to one another, the plate capacitor system is at least partially discharged, and in predetermined second relative positions of the plate systems with respect to one another, the plate capacitor system is at least partially recharged.

4. The apparatus of claim 3, wherein a presence of the first relative positions and the second relative positions of the plate systems with respect to another is ascertained by a position detector.

5. The apparatus of claim 4, wherein a first relative position is present when the plate capacitor system has a low capacitance, and a second relative position is present when the plate capacitor system has a high capacitance.

6. The apparatus of claim 4, wherein as a function of the relative position ascertained by the position detector, at least one switch is controlled and a charging or discharging of the plate capacitor system is thereby brought about.

7. The apparatus of claim 6, wherein the switch is implemented as an electronic switch.

8. The apparatus of claim 1, wherein the generator includes a permanent magnet, and the electrical energy is generated by a motion of an electrical conductor in a field of the permanent magnet.

9. The apparatus of claim 2, wherein the energy is used to charge an energy accumulator that co-moves with the vehicle wheel.

10. The apparatus of claim 1, wherein:

the sensor includes one of a tire pressure sensor, a tire temperature sensor, a tire force sensor, and a tire identification sensor.

11. The apparatus of claim 1, wherein the vehicle includes a motor vehicle.

12. The apparatus of claim 1, wherein the apparatus includes a micromechanical construction.

* * * * *